(12) United States Patent
Kobayashi

(10) Patent No.: US 8,887,204 B2
(45) Date of Patent: Nov. 11, 2014

(54) VIDEO DISTRIBUTION SYSTEM, AND VIDEO DISTRIBUTION METHOD

(75) Inventor: Makio Kobayashi, Kawasaki (JP)

(73) Assignee: NEC Casio Mobile Communications Ltd., Kanagawa (JP)

(*) Notice: Subject to any disclaimer, the term of this patent is extended or adjusted under 35 U.S.C. 154(b) by 0 days.

(21) Appl. No.: 13/879,236

(22) PCT Filed: Sep. 15, 2011

(86) PCT No.: PCT/JP2011/071066
§ 371 (c)(1),
(2), (4) Date: May 10, 2013

(87) PCT Pub. No.: WO2012/049941
PCT Pub. Date: Apr. 19, 2012

(65) Prior Publication Data
US 2013/0247114 A1  Sep. 19, 2013

(30) Foreign Application Priority Data
Oct. 13, 2010 (JP) .............................. P2010-230474

(51) Int. Cl.
*H04N 7/16* (2011.01)
(Continued)

(52) U.S. Cl.
CPC ....... *H04N 21/654* (2013.01); *H04N 21/42222* (2013.01); *H04N 21/21805* (2013.01); *H04N 21/41407* (2013.01); *H04N 21/4728* (2013.01)
USPC ............................................. 725/62; 348/143

(58) Field of Classification Search
None
See application file for complete search history.

(56) References Cited

U.S. PATENT DOCUMENTS

2005/0259173 A1* 11/2005 Nakajima et al. ........ 348/333.12

FOREIGN PATENT DOCUMENTS

JP  11-295783 A  10/1999
JP  2002-268622 A  9/2002
(Continued)

OTHER PUBLICATIONS

Japan publication No. 2009-088850; Author: NEC Corp, Kobayashi Makio; Title: Moving Image Distribution System and Moving Image Distributing Method; Date: Apr. 23, 2009.*

(Continued)

*Primary Examiner* — Nasser Goodarzi
*Assistant Examiner* — Adil Ocak
(74) *Attorney, Agent, or Firm* — Sughrue Mion, PLLC

(57) ABSTRACT

A video distribution system of the present invention distributes a digitally captured video, and includes an imaging device, a server device, and a playback terminal. The imaging device includes: an imager that captures an omnidirectional video using a wide-angle lens; and a controller that transmits a group of frame data constituting the video captured by the imager to the server device. The server device includes: a calculator that divides an image represented by each frame data of the group of frame data from the imaging device into a plurality of regions, converts an image of each region into a normal image, and obtains a group of partial data classified by region; a storage unit that accumulates the group of frame data from the imaging device and accumulates the group of partial data classified by region; and a controller that selects a group of frame data of a video requested from the terminal device and a group of partial data for a region requested from the terminal device in relation to the video from the storage unit and transmits them to the terminal device. The terminal device includes: a display instrument that plays back a video; an attitude sensor that detects rotation angle information of the terminal device; and a controller that transmits, to the server device, identification information of a video to be played back and identification information of a region in relation to the video, the region designated by a user based on the rotation angle information.

2 Claims, 11 Drawing Sheets

(51) Int. Cl.
*H04N 7/18* (2006.01)
*H04N 21/422* (2011.01)
*H04N 21/218* (2011.01)
*H04N 21/654* (2011.01)
*H04N 21/414* (2011.01)
*H04N 21/4728* (2011.01)

(56) References Cited

FOREIGN PATENT DOCUMENTS

| JP | 2003-18561 A | 1/2003 |
|----|--------------|--------|
| JP | 2005-122100 A | 5/2005 |
| JP | 2006-279739 A | 10/2006 |
| JP | 2007-158892 A | 6/2007 |
| JP | 2009-88850 A | 4/2009 |

OTHER PUBLICATIONS

Japan publication No. 11-295783; Author: Canon Inc., Hiroyuki et. al.; Title: Image Pickup Device and Its Control Method; Date: Oct. 29, 1999.*

International Search Report for PCT/JP2011/071066 dated Oct. 11, 2011.

* cited by examiner

US 8,887,204 B2

VIDEO DISTRIBUTION SYSTEM, AND VIDEO DISTRIBUTION METHOD

TECHNICAL FIELD

The present invention relates to a video distribution system and a video distribution method. In particular, the present invention relates to a video distribution system that distributes digitally captured videos, and a video distribution method.

BACKGROUND ART

There is a system using a so-called web camera that distributes via the Internet image data obtained by digital capture. In this system, image data to be distributed is stored in a web camera device that has captured it or in a server device that is separately provided. A user who wants to view the image data accesses the web camera device or the server device from a terminal, and receives the desired image data.

In the case of using a planar lens for the lens of the camera device, since the obtained image is a planar image, handling of the image is simple. However, the imaging scope per capture of a planar lens is comparatively narrow. For that reason, by rotating or raising/lowering the camera with a stepping motor that is provided on a platform, the imaging scope is compensated. Patent Document 1 described below discloses a method of a terminal device performing motor-control of the direction of a movable web camera that is provided remotely.

As the lens of the camera device, a wide-angle lens such as a fisheye lens is sometimes used. In the case of using a fisheye lens, since it is possible to cover 180 degrees horizontal and vertical in a single capture, there is no need to frequently move the camera as in the case of a planar lens. In Patent Document 2 described below, a digital camera that adopts a fisheye lens is disclosed. The digital camera that is disclosed in Patent Document 2 shows still images that are captured by the fisheye lens as planar images on a display at the camera rear surface.

In the case of using a planar lens in a camera device of a distribution system, as described above, in order to broaden the imaging scope, it is necessary to frequently move the camera with a stepping motor. For that reason, complicated motor-control that is synchronized with the user terminal becomes necessary. As a result, it is difficult to abbreviate the processing time of the capturing, and there is the inconvenience of stress arising in the user waiting for the distribution.

In the case of using a fisheye lens, the capture scope is expanded each time. However, since distortion appears in the omnidirectional image that is captured, it is necessary to convert the distorted image to a normal image. In particular, in the case of a video, in order to smoothly replay the video, it is required to quickly perform the conversion to a normal image. The method that is disclosed in the aforementioned Patent Document 2 relates to processing of an image that is captured by a fisheye lens. In this process, the captured image is a still image, and no consideration is given to video.

In order to solve such issues, art is known that enhances the convenience of a terminal device that replays a video captured using a fisheye lens (for example, refer to Patent Document 3).

PRIOR ART DOCUMENTS

Patent Documents

[Patent Document 1] Japanese Unexamined Patent Application, First Publication No. H11-295783
[Patent Document 2] Japanese Unexamined Patent Application, First Publication No. 2006-279739
[Patent Document 3] Japanese Unexamined Patent Application, First Publication No. 2009-088850

SUMMARY OF THE INVENTION

Problem to be Solved by the Invention

However, when a user tries to display a video of a desired region on a display instrument by the art disclosed in Patent Document 3, it is cumbersome and difficult to use due to performing selection by operating keys of the key portion of a mobile terminal.

Means for Solving the Problem

In order to solve the aforementioned issues, a video distribution system according to a first exemplary aspect of the present invention distributes a digitally captured video, and includes an imaging device, a server device, and a playback terminal. The imaging device includes: an imager that captures an omnidirectional video using a wide-angle lens; and a controller that transmits a group of frame data constituting the video captured by the imager to the server device. The server device includes: a calculator that divides an image represented by each frame data of the group of frame data from the imaging device into a plurality of regions, converts an image of each region into a normal image, and obtains a group of partial data classified by region; a storage unit that accumulates the group of frame data from the imaging device and accumulates the group of partial data classified by region; and a controller that selects a group of frame data of a video requested from the terminal device and a group of partial data for a region requested from the terminal device in relation to the video from the storage unit and transmits them to the terminal device. The terminal device includes: a display instrument that plays back a video; an attitude sensor that detects rotation angle information of the terminal device; and a controller that transmits, to the server device, identification information of a video to be played back and identification information of a region in relation to the video, the region designated by a user based on the rotation angle information.

A video distribution method according to a second aspect of the present invention is for distributing a digitally captured video. The video distribution method includes: accumulating, in a server device, a group of frame data constituting an omnidirectional video captured using a wide-angle lens; dividing an image represented by each frame data of the group of frame data into a plurality of regions, converting an image of each region into a normal image, and obtaining a group of partial data classified by region in the server device; accumulating the group of partial data classified by region in the server device; transmitting identification information of a video to be played back by a terminal device to the server device; transmitting a group of frame data of the video corresponding to the identification information from the server device to the terminal device; playing back the video by the terminal device using the group of frame data transmitted from the server device; transmitting, to the server device, identification information of a region in relation to the video played back by the terminal device, the region designated by a user based on rotation angle information detected by an attitude sensor of the terminal device; transmitting a group of partial data corresponding to the identification information of the designated region from the server device to the terminal device; and playing back a video by the terminal device using the group of partial data transmitted from the server device.

The exemplary aspects of the present invention are not limited to the aforementioned.

Effect of the Invention

In the exemplary embodiment of this invention, it is possible to display on a display instrument a region with a coordinate position that depends on the rotation angle, and so a user can cause a video of a desired region to be displayed intuitively.

EMBODIMENTS FOR CARRYING OUT THE INVENTION

Hereinbelow, the present invention shall be described through exemplary embodiments of the present invention. The following exemplary embodiments do not limit the invention according to the claims. Also, all of the combinations of the characteristics described in the exemplary embodiments may not be necessary for the means for solving the problems of the present invention.

Figure 1:
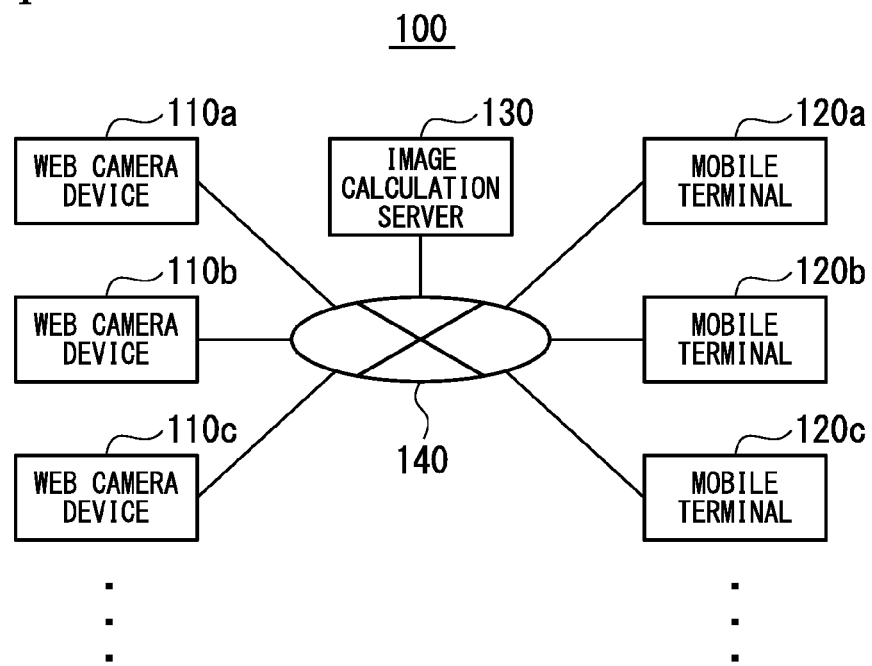
FIG. 1 is a diagram that shows one example of the use environment of a video distribution system according to one exemplary embodiment of the present invention.

FIG. 1 shows an example of the use environment of a video distribution system 100 according to an exemplary embodiment. The video distribution system 100 is a system that distributes digitally captured videos.

The video distribution system 100 includes a plurality of web camera devices 110a, b, c, . . . (hereinbelow collectively referred to as web cameras devices 110), a plurality of mobile terminals 120a, b, c, . . . (hereinbelow collectively referred to as mobile terminals 120), an image calculation server 130, and a communication line 140. The communication line 140 includes a computer network such as the Internet, a core network of a communication provider, and various local networks. The web camera device 110 may be an example of the "imaging device" in the present exemplary embodiment. The image calculation server 130 may be an example of the "server device" in the present exemplary embodiment. The mobile terminal 130 may be an example of the "terminal device" in the present exemplary embodiment.

In the present exemplary embodiment, with the object of preventing the description from becoming complicated, the constitution shall be described in which the video distribution system 100 includes one image calculation server 130. However, the video distribution system 100 may include a plurality of image calculation servers 130.

Figure 2:
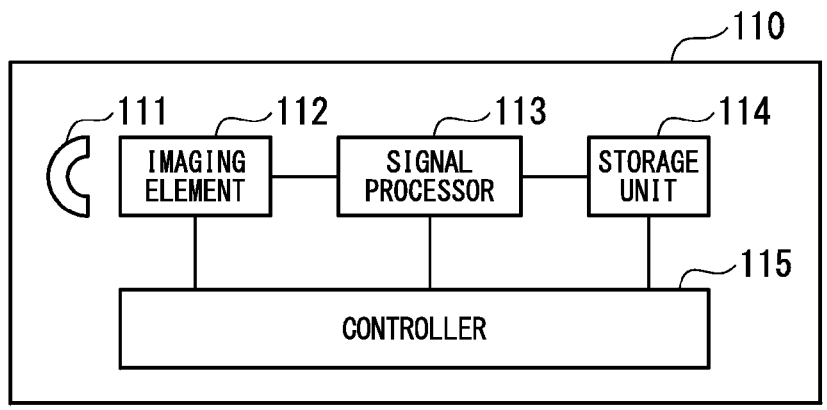
FIG. 2 is a diagram that shows one example of the block configuration of a web camera device shown in FIG. 1.

FIG. 2 shows an example of a block configuration of the web camera device 110. The web camera device 110 has a fisheye lens 111, an imaging element 112, a signal processor 113, a storage unit 114, and a controller 115. The fisheye lens 111 may be an example of the "wide-angle lens" in the present exemplary embodiment. Hereinbelow, the function and operation of each constituent element shall be described.

The imaging element (imager) 112 captures a video by the fisheye lens 111. It is possible to use a charge coupled device (CCD) or the like for the imaging element 112. The signal processor 113 converts the analog signal of the video that the imaging element 112 has output to a digital signal, and stores that in the storage unit 1244. The digital signal to be stored in the storage unit 1244 is a series of still image data that constitute the video, and correspond to a series of frame data. The controller 115 has a function for controlling the web camera device 110 and a function for communicating with the communication line 140. The controller 115 transmits to the image calculation server 130 the frame data that is housed in the storage unit 114. Frame information for identifying each frame is attached to the frame data that is to be transmitted at this time.

Figure 3:
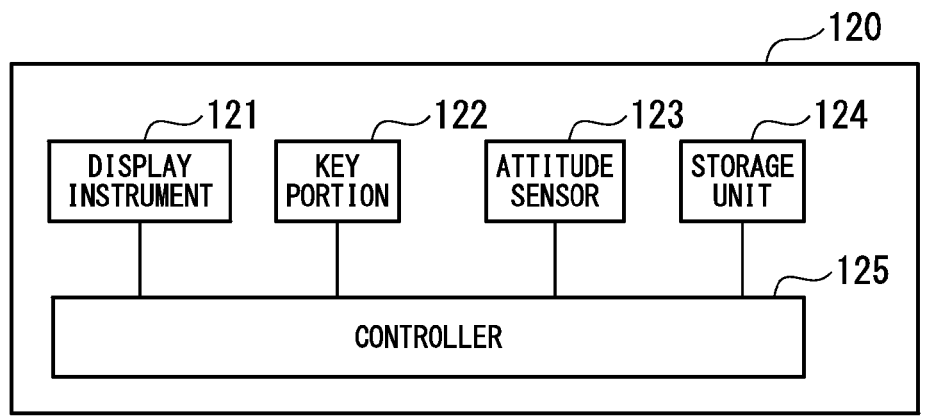
FIG. 3 is a diagram that shows one example of the block configuration of a mobile terminal shown in FIG. 1.

FIG. 3 shows an example of a block configuration of the mobile terminal 120. The mobile terminal 120 has a display instrument 121, a key portion 122, an attitude sensor 123, a storage unit 124, and a controller 125. Hereinbelow, the function and operation of each constituent element shall be described.

Figure 5:
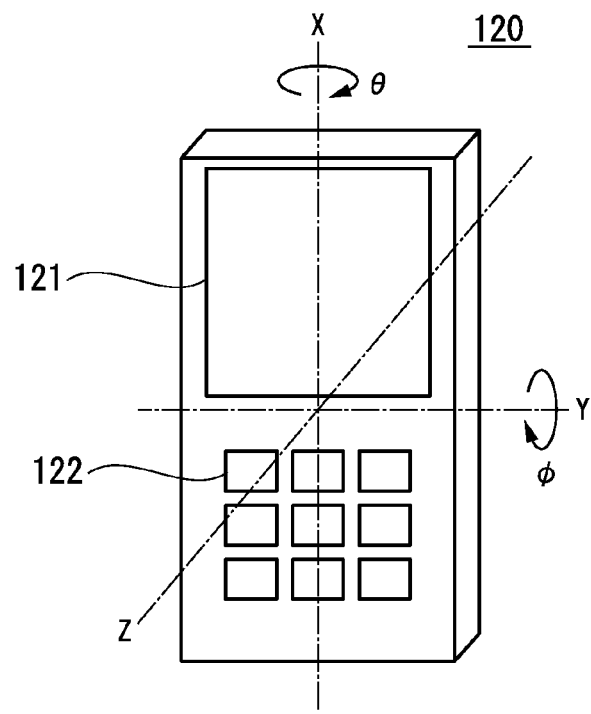
FIG. 5 is a diagram for describing an attitude sensor of the mobile terminal shown in FIG. 3.

The storage unit 124 stores video data. The display instrument 121 displays a video corresponding to the data of the storage unit 124. The key portion 122 functions as operation buttons. As shown in FIG. 5, the vertical direction of the surface of the display instrument 121 of the mobile terminal 120 serves as the X-axis direction. The horizontal direction of the surface of the display instrument 121 serves as the Y-axis direction. The perpendicular direction to the surface of the display instrument 121 serves as the Z-axis direction. The X axis, Y axis and Z axis are mutually orthogonal. The attitude sensor 123 is capable of detecting the rotation angle centered on each directional axis, and notifies the controller 125 of the detected rotation angle. The controller 125 controls each portion. The controller 125 has a function that communicates with the communication line 140. The controller 125 acquires from the image calculation server 130 data of a video that is designated from the user by input operations by the key portion 122 and the attitude sensor 123.

Figure 4:
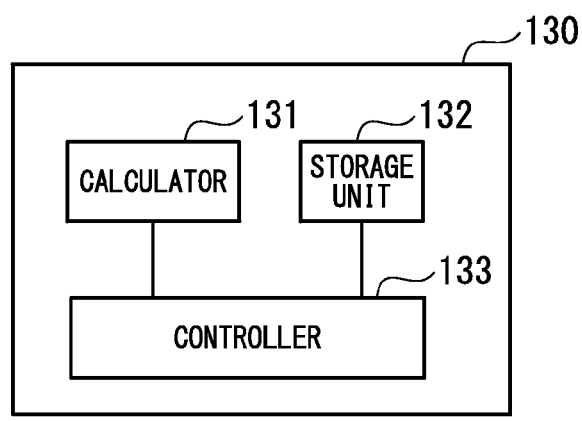
FIG. 4 is a diagram that shows one example of the block configuration of a image calculation server shown in FIG. 1.

FIG. 4 shows an example of the block configuration of the image calculation server 130. The image calculation server 130 has a calculator 131, a storage unit 132, and a controller 133. Hereinbelow, the function and operation of each constituent element shall be described.

The calculator 131 performs division processing and normal image processing on frame data from the web camera device 110. The storage unit 132 stores video data. The controller 133 has a function for communicating with the communication line 140.

The calculator 131 may be constituted by software, and may be constituted with a special-purpose digital processor (DSP). The controller 133 stores frame data of a video that is received from the web camera device 110 in the storage unit 132 together with the aforementioned frame information. The calculator 131 sequentially extracts the frame data of one frame from the storage unit 132, referring to the frame information. Then, the calculator 131 performs division processing that divides an image that each frame data that has been extracted expresses into a predetermined region.

Figure 6:
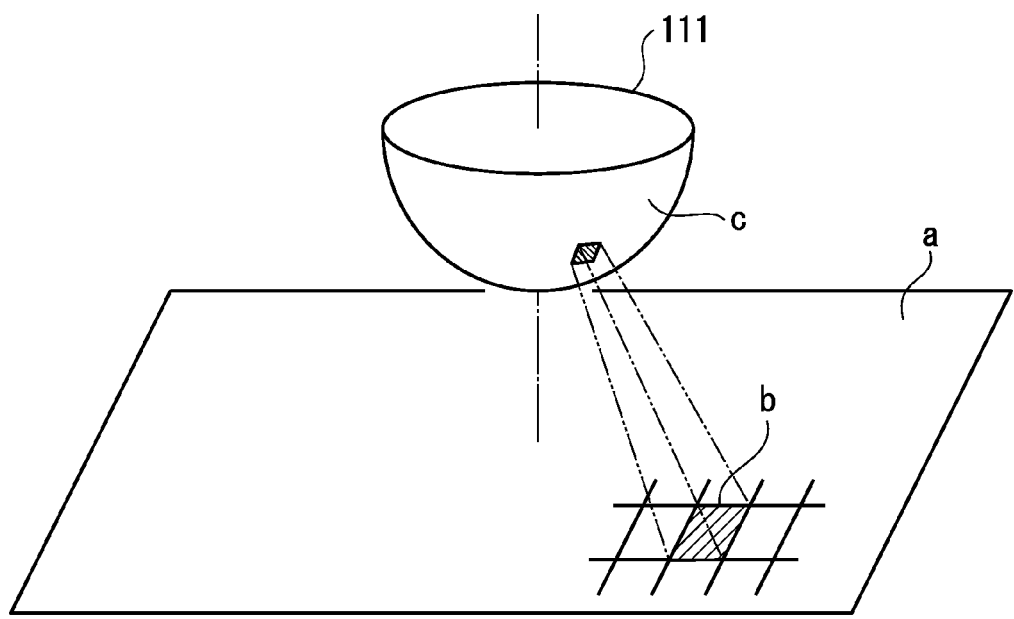
FIG. 6 is a diagram for describing a fisheye lens shown in FIG. 2 and an imaging target region.

Since the frame data that the image calculation server 130 has received is omnidirectional image data captured by the fisheye lens 111, as shown in FIG. 6, distortion appears in the image. The omnidirectional image shown in FIG. 6 is an image that is obtained by equiangular imaging with the fisheye lens 111 the aggregate of portions b of the region a of the imaging target. In the omnidirectional image, the greater the distance of the portion (b) from the lens surface c of the fisheye lens 111, the more the image is condensed and therefore the stronger the distortion.

After performing the aforementioned division processing on the omnidirectional image that the frame data shows, the calculator 131 performs normal image processing that corrects the distortion of the image of each region that has been divided. Then, the calculator 131, after adding information for identifying that region, stores the partial data that has been subjected to normal image processing in the storage unit 132. In the storage unit 132, the group of frame data that constitutes the video and groups of partial data per region obtained from each frame data are accumulated. The frame data is the overall image data that includes distortion owing to the fisheye lens 111. The partial data is data of a partial image in which the distortion is corrected by normal image processing.

Figure 7:
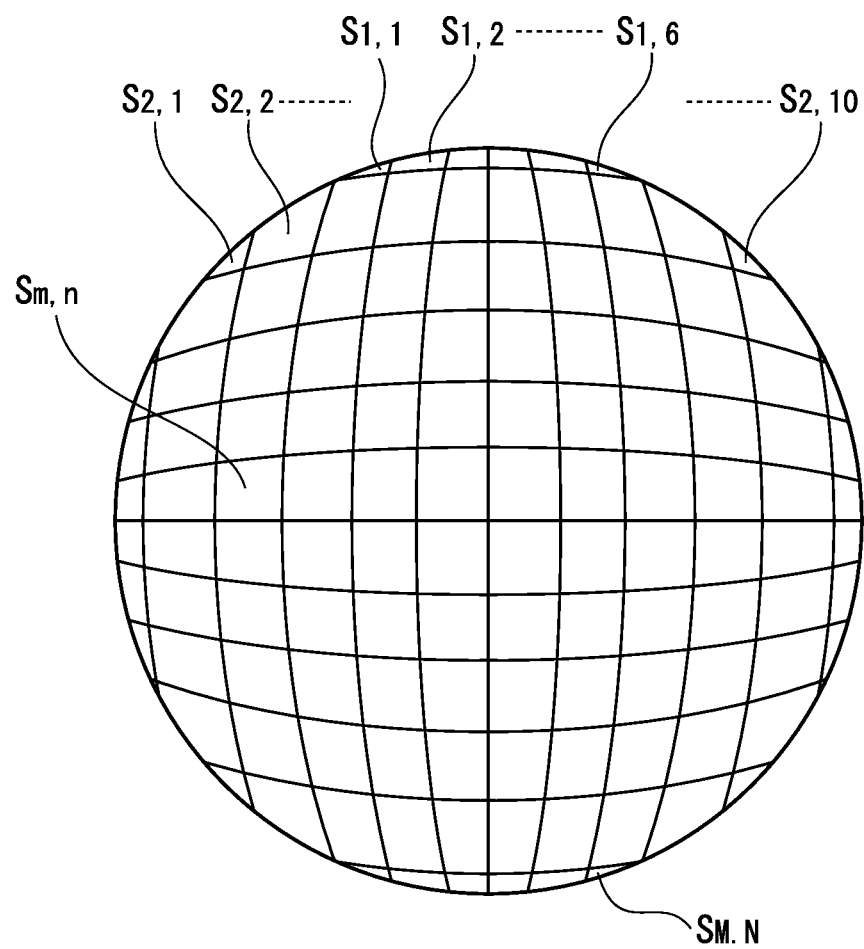
FIG. 7 is a diagram for describing a division processing of an omnidirectional image in the one exemplary embodiment of the present invention.

Referring to FIG. 7, the division processing of the frame data by the calculator 131 shall be described. FIG. 7 shows an example of an omnidirectional image that is divided into a mesh state. The omnidirectional image of the illustration can be considered an image in which the capture target region (FIG. 6: a) that is divided at equally-spaced intervals in the horizontal direction and the vertical direction is projected by the fisheye lens 111. In the omnidirectional image of FIG. 7, an arbitrary divided region is identified as "$S_{m,n}$", and the capture target region is divided into (M+N) parts in total. The calculator 131 performs the normal image processing on each region $S_{m,n}$.

Figure 8:
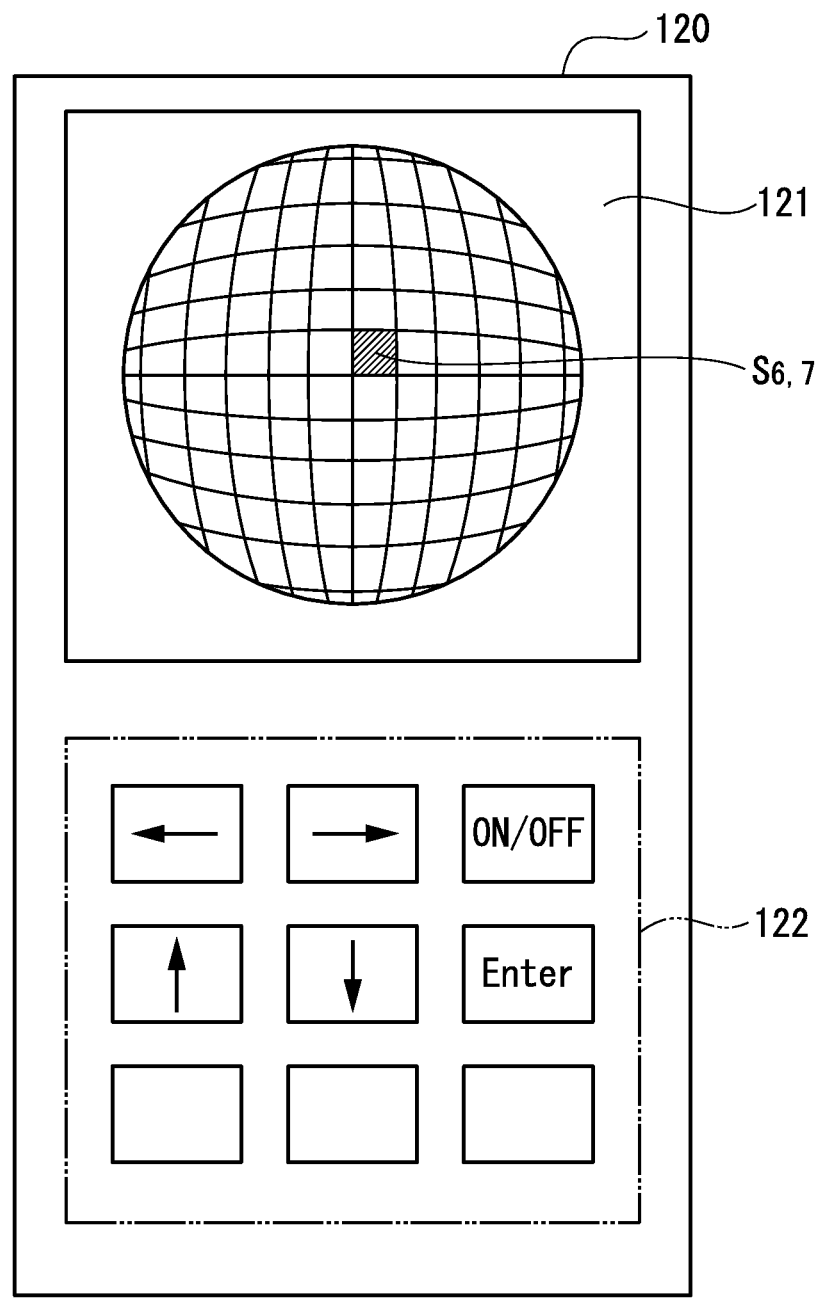
FIG. 8 is a diagram for describing the mobile terminal shown in FIG. 3.

FIG. 8 shows a display example of a video on the mobile terminal 120. In the illustrated example, the state is shown of a similar image as the image of FIG. 7 being displayed on the display instrument 121 of the mobile terminal 120, and the cursor being at region $S_{6,7}$ in the image. The image of FIG. 8 is an image that is obtained by superimposing the data for displaying the mesh-state divided regions on the frame data.

The data for displaying the divided regions on the display instrument 121 is supplied from the image calculation server 130 together with the frame data.

The user of the mobile terminal 120, in the case of wanting to view the video of a certain region in close-up on the screen of the display instrument 121, can designate the region to be viewed by moving the cursor to the desired region with the "←", "→", "↑", and "↓" direction keys of the key portion 122, and pressing the "Enter" key.

Figure 9:
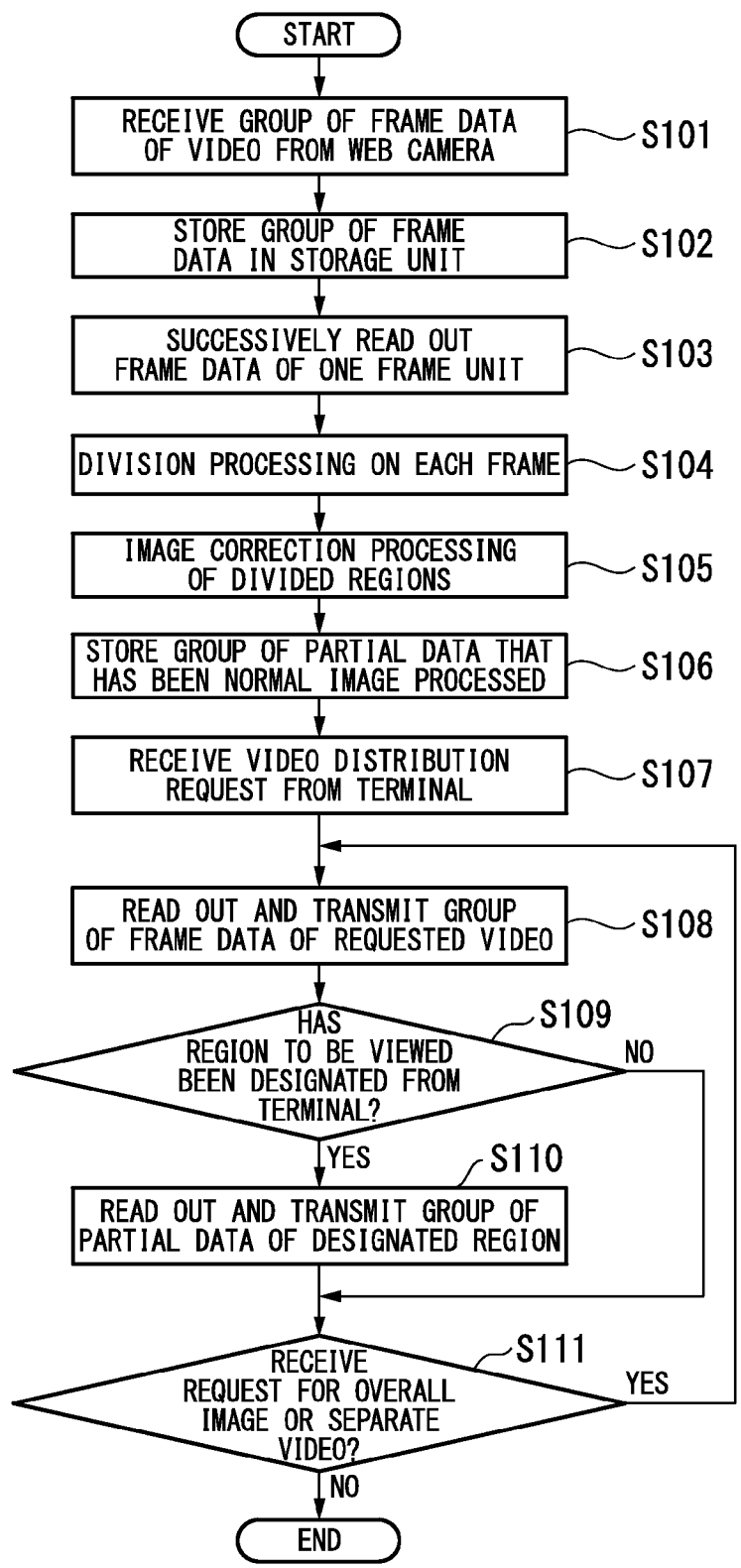
FIG. 9 is a diagram that shows one example of the operational flow of the image calculation server shown in FIG. 4.

FIG. 9 is a diagram that shows an example of the operation flow of the image calculation server. Upon receiving a group of frame data of a series of a video captured using a fisheye lens 111 from the web camera device 110 (S101), the image calculation server 130 stores them in the storage unit 132 (S102). The image calculation server 130 successively reads out the data of one frame portion from the group of frame data stored in the storage unit 132 (S103). Each time the image calculation server 130 reads out frame data, it divides the omnidirectional image expressed by that frame data into a plurality of regions (S104). Specifically, the omnidirectional image is divided in the manner shown in FIG. 7.

The image calculation server 130 performs normal image processing that corrects distortions of the image of each region that is divided (S105). The image calculation server 130 successively stores the partial data of the processed region in the storage unit 132 (S106).

At this time, the image calculation server 130 attaches to the groups of partial data to be stored in the storage unit 132 IDs such as the aforementioned "$S_{m,n}$" (FIG. 7) for identifying the regions.

The image calculation server 130, when receiving a request for distributing a video from the mobile terminal 120, receives the ID information of that video together with the distribution request message (S107). The image calculation server 130 reads out the group of frame data of the video corresponding to the received ID information and successively transmits it to the mobile terminal 120 (S108). Also, the image calculation server 130, when transmitting the group of frame data, in conjunction transmits data for displaying the divided regions as shown in FIG. 7 on the display instrument 121 of the mobile terminal 120.

Subsequently, the image calculation server 130, in the case of having received a region designation message and the ID information of that region from the mobile terminal 120 in relation to the distributed video (S109: Yes), reads out the group of partial data of the region corresponding to the received ID information and transmits it to the mobile terminal 120 (S110).

Then, in the case of a distribution request of the overall image in relation to the aforementioned video or a distribution request of a separate video being sent from the mobile terminal 120 to the image calculation server 130 (S111: Yes), the image calculation server 130 transmits the group of frame data of the requested video (S108).

Figure 10:
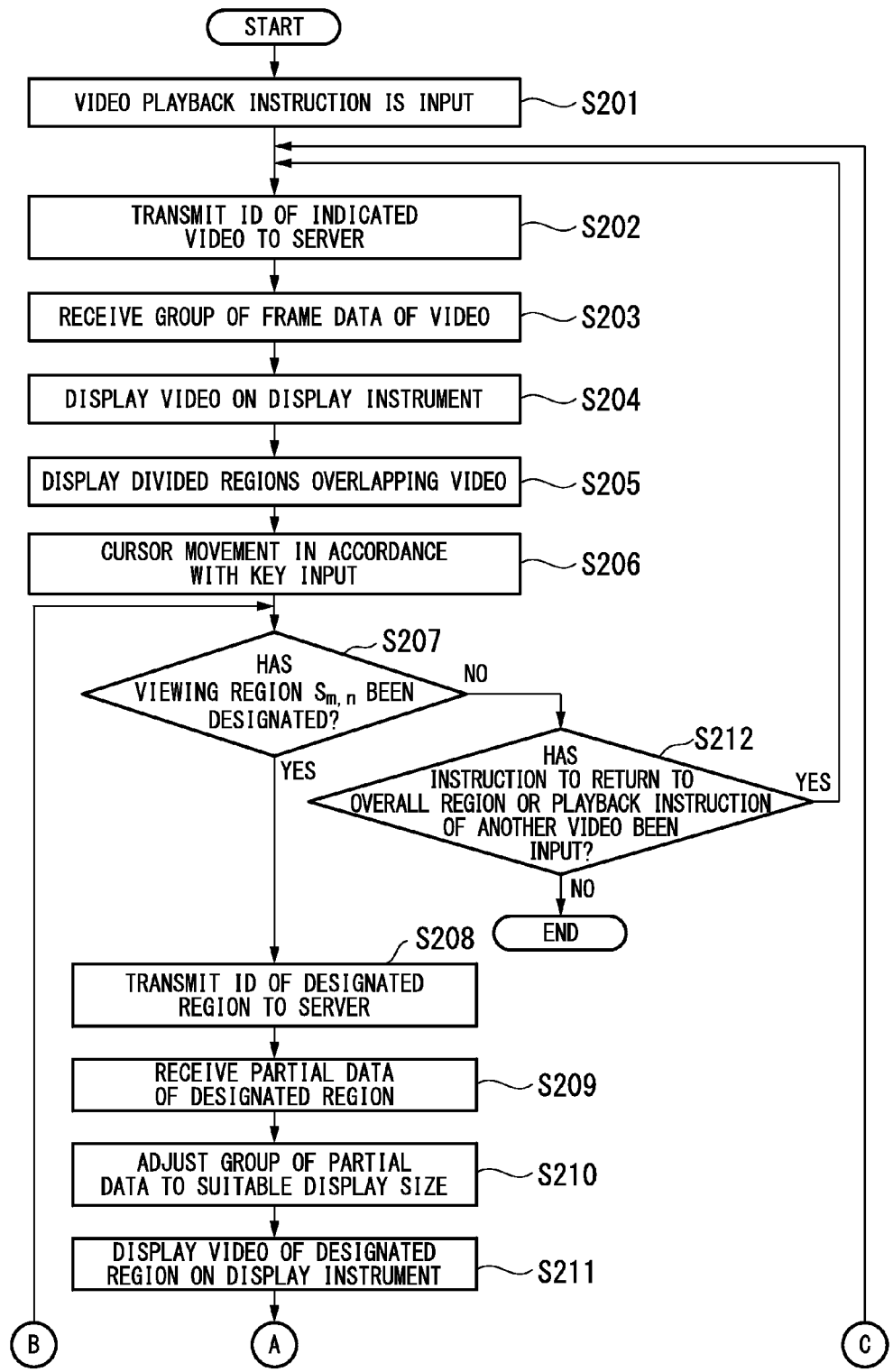
FIG. 10 is a diagram that shows one example of the operational flow of the mobile terminal shown in FIG. 3.
Figure 11:
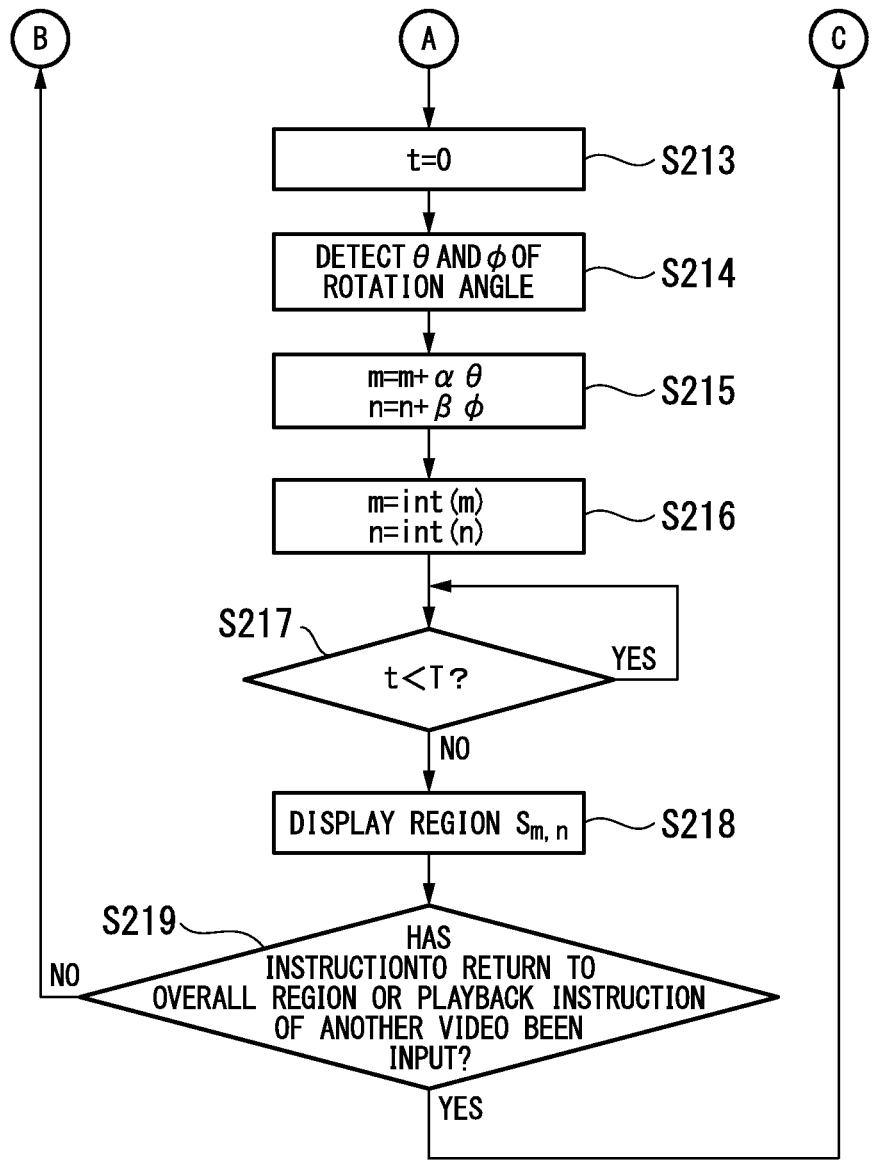
FIG. 11 is a diagram that shows the one example of the operational flow of the mobile terminal shown in FIG. 3.

FIGS. 10 and 11 show an example of the operation flow of the mobile terminal 120. When the mobile terminal 120 recognizes that a video replay instruction has been input by the user (S201), it transmits a message for requesting distribution of the designated video and the ID information of that video to the image calculation server 130 (S202).

Figure 12:
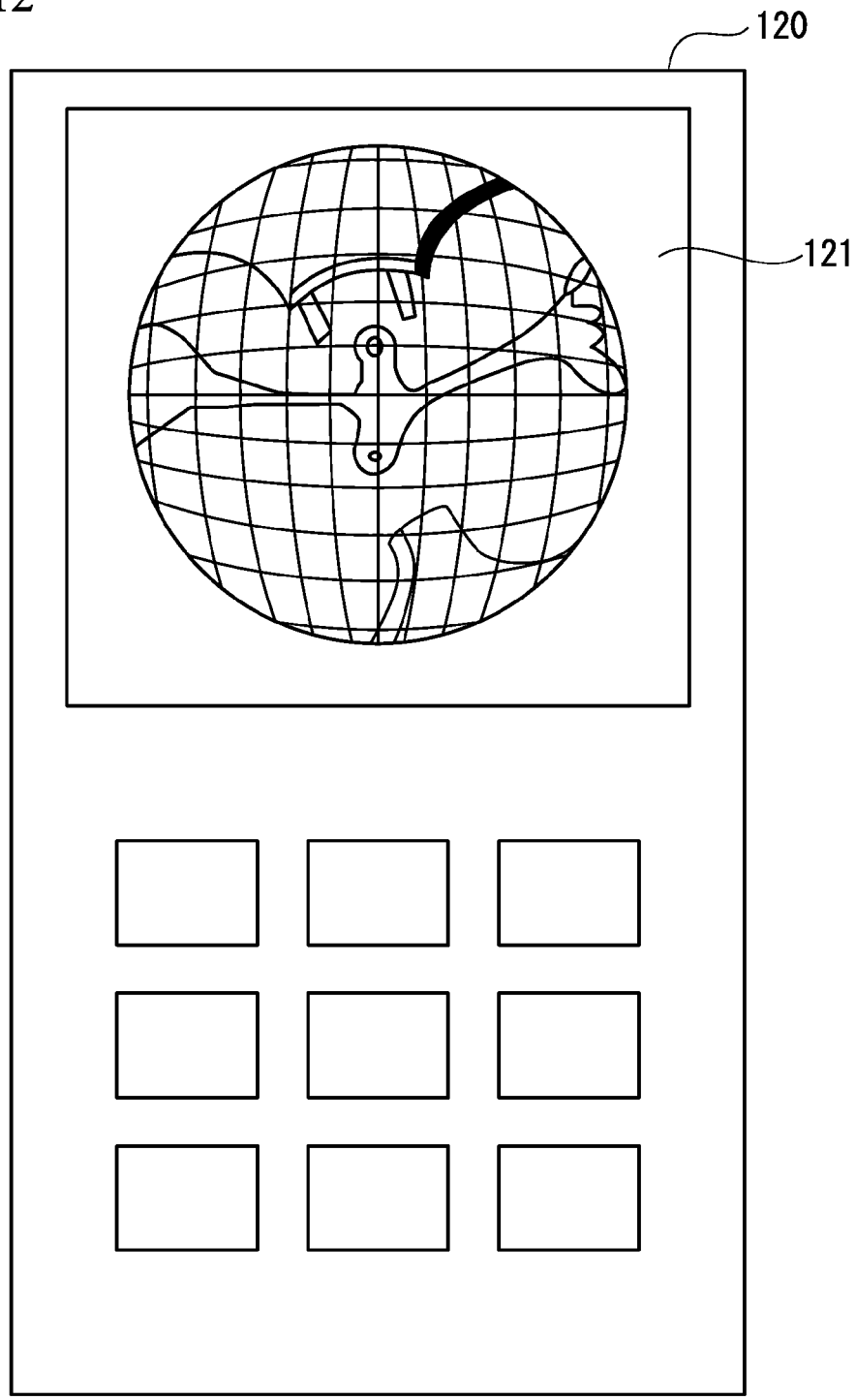
FIG. 12 is a diagram for describing a screen display of the mobile terminal shown in FIG. 3.

The mobile terminal 120 receives the group of frame data of the video and data for displaying the divided regions that are transmitted from the image calculation server 130 in accordance with the aforementioned request, and stores them in the storage unit 124 (S203). Then, the mobile terminal 120 displays the frame data successively read out from the storage unit 124 as a video on the display instrument 121 (S204). FIG. 12 shows an example of the screen that is displayed on the display instrument 121 at this time. As shown in FIG. 12, a screen in which mesh-state divided regions are superimposed on the video is displayed on the display instrument 121 of the mobile terminal 120 (S205). Instead of the divided regions being automatically displayed during replay of the video, the divided regions may be turned ON/OFF in accordance with a key input by the user.

The mobile terminal 120 moves the cursor position on the screen in accordance with key operation by the user corresponding to the screen of the display instrument 121 (S206). In the case of a viewing region being designated by the user in relation to the video being display on the display instrument 121 (S207: Yes), the mobile terminal 120 transmits the ID information of that region to the image calculation server 130 (S208).

Figure 13:
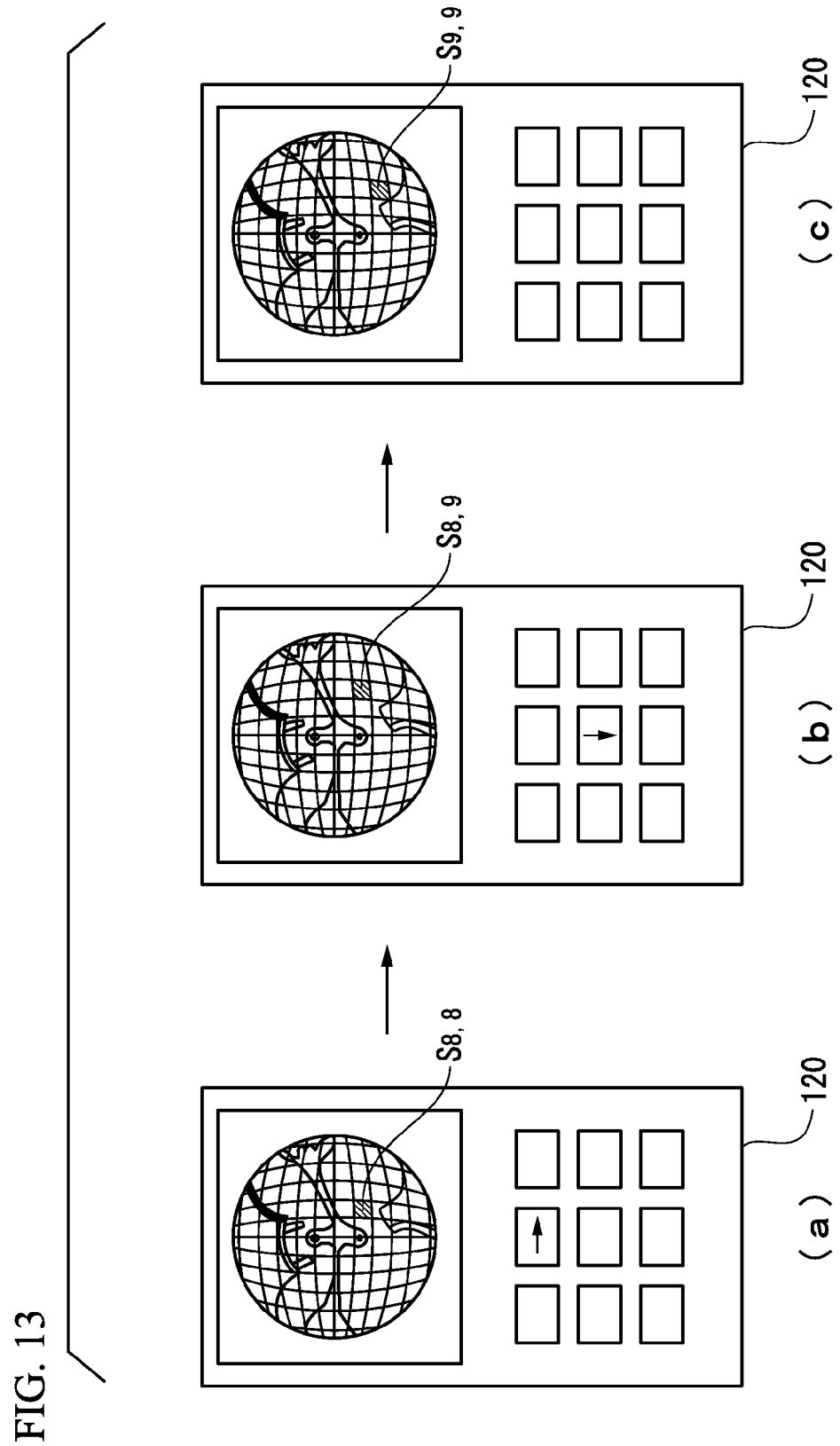
FIG. 13 is a diagram for describing the screen display of the mobile terminal shown in FIG. 3.
Figure 14:
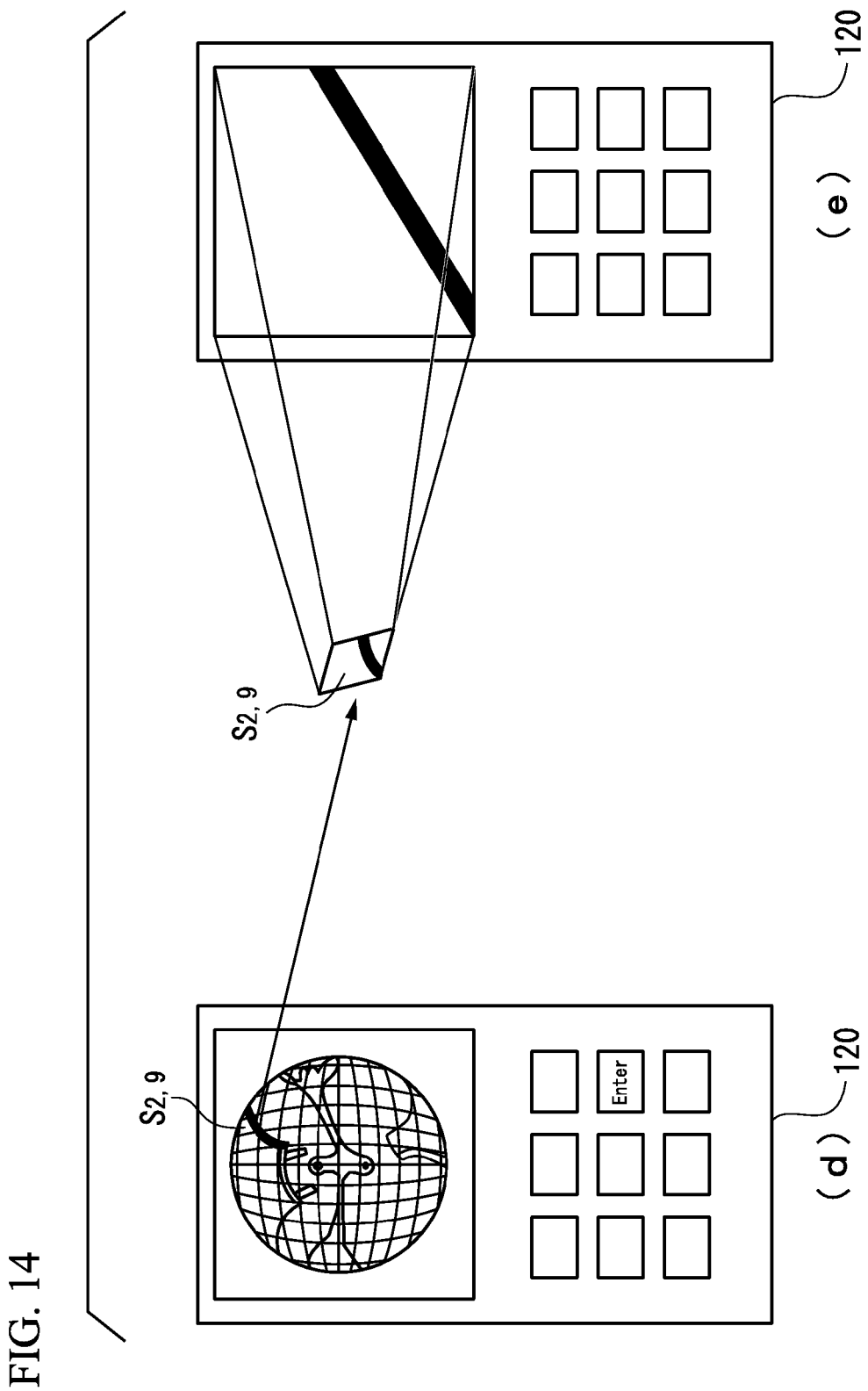
FIG. 14 is a diagram for describing the screen display of the mobile terminal shown in FIG. 3.

An example shall be given of movement of the cursor position in the mobile terminal 120 and designation of the viewing region, along FIG. 13 and FIG. 14. In FIG. 13, now, the cursor on the screen is assumed to be at region $S_{8,8}$ (refer to part (a)). In this state, when the user presses the "→" key once, the cursor moves rightward to region $S_{8,9}$ (refer to part (b)). Moreover, when the user presses the "↓" key once, the cursor moves downward to the region $S_{9,9}$ (refer to part (c)).

In FIG. 14, when intending to view for example region $S_{2,9}$ close-up, the user, in the state of aligning the cursor with that region $S_{2,9}$, presses the "Enter" key (refer to part (d)).

The controller 125 of the mobile terminal 120, upon recognizing that the "Enter" key has been pressed, informs the image calculation server 130 of the region ($S_{2,9}$) corresponding to the cursor position at the current time as ID information of the viewing region.

The mobile terminal 120 receives the group of partial data of the region corresponding to the notified ID information from the image calculation server 130, and stores it in the storage unit 124 (S209). The mobile terminal 120 displays the partial data that it has successively read out from the storage unit 124 after adjusting the data to a display size that suits the display instrument 121 (S210, S211). Thereby, as shown in FIG. 14, the video of the region $S_{2,9}$ whose viewing has been designated is displayed on the display instrument 121 with its distortion corrected and in an enlarged state (refer to part (e)).

In the state of the designated region ($S_{2,9}$) being displayed, in the case of an instruction to return to the overall image or an instruction to replay another video being input from the user (S212: Yes), the mobile terminal 120 notifies the image calculation server 130 of the ID information of the designated video (S202).

Hereinbelow, the operation of causing a desired video to be displayed on the display instrument 121 by the attitude of the mobile terminal 120 shall be described. A given time T and given constants α and β are set in advance (not illustrated). The time T specifies the time interval that the attitude sensor 123 performs angle detection. The constants α and β are weighting constants of the rotational angle and the display region $S_{m,n}$ positional coordinates. First, the time t is set to zero (S213). The attitude sensor 123 detects the rotational angle θ around the X direction and the rotational angle φ around the Y direction, and informs the controller 125 of the detection result (S214).

The controller 125 performs the following calculation (S215).

$$m = m + \alpha\theta$$

$$n = n + \beta\phi$$

The controller 125 performs the following calculation to round off "m" and "n" after the decimal point in order to have them correspond to the coordinates of the region S.

$$m = int(m)$$

$$n = int(n)$$

By this calculation, new values of "m" and "n" are calculated (S216).

Next, when the time t reaches the time T (S217: No), the region $S_{m,n}$ is displayed on the display instrument 121 (S218).

In the state of the designated region ($S_{m,n}$) being displayed, in the case of an instruction to return to the overall image or a playback instruction of another video not having been input from the user (S219: No), the mobile terminal 120 returns to Step S207 and performs an operation of transmitting the ID of the indicated region to the server.

That is to say, it is possible to detect the rotational angles θ and φ at each given time T that is decided, and successively display the region $S_{m,n}$ of a value weighted by the constants α and β at those angles on the display instrument 121. Accordingly, the user can sequentially obtain the video of the position that is separated by an amount corresponding to the inclination of the mobile terminal 120. That is to say, it is possible to intuitively express the video of the desired position in the display instrument 121. In the case of an instruction to return to the overall image or a playback instruction of another video having been input from the user (S219: Yes), the ID information of the indicated video is notified to the image calculation server 130 (S202).

According to the exemplary embodiment of the present invention, the mobile terminal 120 is provided in the attitude sensor 123. The axis extending in the vertical direction of the display instrument 121 surface of the mobile terminal 120 serves as the X axis, while the axis extending in the horizontal direction of the display instrument 121 surface serves as the Y axis. The attitude sensor 123 detects the rotational angle θ about the X axis, and the rotational angle φ about the Y axis, and designates the coordinates of a region $S_{m,n}$ corresponding to a value that is weighted to those rotational angles θ, φ.

Accordingly, it is possible to display on the display instrument 121 the region $S_{m,n}$ of the coordinate position corresponding to the rotational angles, and so the user can display a video of a desired region intuitively.

In the aforementioned exemplary embodiment, a single region is designated from the video shown on the display instrument 120, but the region that can be designated is not limited to one divided region. The region that can be designated may be constituted by a plurality of adjacent divided regions. The format of the division may be a format other than a mesh, such as division by either one of a horizontal direction or a vertical direction, or division by a plurality of circular regions that are partially overlapping. The lens of the web camera device 110 is not limited to the fisheye lens 111, and provided it is capable of capturing an omnidirectional image, may be a wide-angle lens of another specification.

Hereinabove, the present invention has been described with reference to the exemplary embodiment, but the present invention is not limited to the aforementioned exemplary embodiment. Within the scope of the present invention, various modifications to the configurations and details of the invention that can be understood by a person skilled in the art are possible.

This application is based upon and claims the benefit of priority from Japanese patent application No. 2010-230474, filed Oct. 13, 2010, the disclosure of which is incorporated herein in its entirety by reference.

INDUSTRIAL APPLICABILITY

The present invention can be applied to a video distribution system and video distribution method. According to this system and method, it is possible to display on a display instrument a region of a coordinate position that corresponds to the rotational angles of a display terminal.

REFERENCE SYMBOLS

100 Video distribution system
110 Web camera device

111 Fisheye lens
112 Imaging element
113 Signal processor
114 Storage unit
115 Controller
120 Mobile terminal
121 Display instrument
122 Key portion
123 Attitude sensor
124 Storage unit
125 Controller
130 Image calculation server
131 Calculator
132 Storage unit
133 Controller
140 Communication line

The invention claimed is:

1. A video distribution system that distributes a digitally captured video, the video distribution system comprising an imaging device, a server device, and a playback terminal, the imaging device comprising:
an imager that captures an omnidirectional video using a wide-angle lens; and
a controller that transmits a group of frame data constituting the video captured by the imager to the server device, the server device comprising:
a calculator that divides an image represented by each frame data of the group of frame data from the imaging device into a plurality of regions, converts an image of each region into a normal image, and obtains a group of partial data classified by region;
a storage unit that accumulates the group of frame data from the imaging device and accumulates the group of partial data classified by region; and
a controller that selects a group of frame data of a video requested from the terminal device and a group of partial data for a region requested from the terminal device in relation to the video from the storage unit and transmits them to the terminal device, and the terminal device comprising:
a display instrument that plays back a video;
an attitude sensor that detects a rotation angle around a first axis and a rotation angle around a second axis, the first axis extending in a vertical direction of a surface of the display instrument, the second axis extending in a horizontal direction of the surface of the display instrument; and
a controller that calculates a region designated by a user based on the rotation angle around the first axis and the rotation angle around the second axis, the controller transmitting, to the server device, identification information of a video to be played back and identification information of the calculated region.

2. A video distribution method for distributing a digitally captured video, the method comprising:
accumulating, in a server device, a group of frame data constituting an omnidirectional video captured using a wide-angle lens;
dividing an image represented by each frame data of the group of frame data into a plurality of regions, converting an image of each region into a normal image, and obtaining a group of partial data classified by region in the server device;
accumulating the group of partial data classified by region in the server device;
transmitting identification information of a video to be played back by a terminal device to the server device;
transmitting a group of frame data of the video corresponding to the identification information from the server device to the terminal device;
playing back the video by the terminal device using the group of frame data transmitted from the server device;
detecting a rotation angle around a first axis and a rotation angle around a second axis by an attitude sensor of the terminal device, the first axis extending in a vertical direction of a surface of a display instrument of the terminal device, the second axis extending in a horizontal direction of the surface of the display instrument;
calculating a region designated by a user based on the rotation angle around the first axis and the rotation-angle around the second axis;
transmitting, to the server device, identification information of the calculated region;
transmitting a group of partial data corresponding to the identification information of the calculated region from the server device to the terminal device; and
playing back a video by the terminal device using the group of partial data transmitted from the server device.

* * * * *